United States Patent
Lv et al.

(10) Patent No.: US 11,085,789 B2
(45) Date of Patent: Aug. 10, 2021

(54) NAVIGATION METHOD, APPARATUS, AND TERMINAL, AND STORAGE MEDIUM

(71) Applicant: TENCENT TECHNOLOGY (SHENZHEN) COMPANY LIMITED, Shenzhen (CN)

(72) Inventors: Meng Lv, Shenzhen (CN); Shufeng Gao, Shenzhen (CN); Wangyu Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 312 days.

(21) Appl. No.: 16/279,105

(22) Filed: Feb. 19, 2019

(65) Prior Publication Data

US 2019/0178675 A1    Jun. 13, 2019

Related U.S. Application Data

(63) Continuation of application No. PCT/CN2017/108288, filed on Oct. 30, 2017.

(30) Foreign Application Priority Data

Nov. 10, 2016   (CN) .......................... 201610993503.2

(51) Int. Cl.
G01C 21/20        (2006.01)
G01C 21/34        (2006.01)
G01C 21/36        (2006.01)

(52) U.S. Cl.
CPC ......... *G01C 21/3673* (2013.01); *G01C 21/20* (2013.01); *G01C 21/34* (2013.01);
(Continued)

(58) Field of Classification Search
CPC .... G01C 21/3673; G01C 21/34; G01C 21/36; G01C 21/3629; G01C 21/20; G01C 21/3626; G01C 21/3605; G01C 21/3652
(Continued)

(56) References Cited

U.S. PATENT DOCUMENTS

| 5,964,821 A  | * | 10/1999 | Brunts ............... G01C 21/3611 340/990 |
| 2004/0048620 A1 | * | 3/2004 | Nakahara ........... G01C 21/3667 455/456.1 |

(Continued)

FOREIGN PATENT DOCUMENTS

| CN | 101614546 A | 12/2009 |
| CN | 104101353 A | 10/2014 |
| CN | 104931037 A | 9/2015 |

OTHER PUBLICATIONS

The World Intellectual Property Organization (WIPO) International Search Report for PCT/CN2017/108288 dated Feb. 5, 2018 6 Pages (including translation).

*Primary Examiner* — Ian Jen
*Assistant Examiner* — Hossam M Abd El Latif
(74) *Attorney, Agent, or Firm* — Anova Law Group, PLLC (57) ABSTRACT

A navigation method for a terminal includes determining navigation guiding points on a navigation path; obtaining each directional road name of each navigation guiding point, the directional road name being a road name of a second road segment to which the navigation guiding point leads; and calculating a matching degree between each directional road name and direction information of each third road segment, the third road segment being a first road segment on the navigation path, located after the navigation guiding point, and the direction information of the third road segment comprising a road name of the third road segment and
(Continued)

a directional road name of the third road segment. The method also includes determining a weight value of each directional road name according to the matching degree; and when the terminal is at the navigation guiding point, prompting each directional road name according to the weight value.

18 Claims, 6 Drawing Sheets

(52) U.S. Cl.
CPC ......... *G01C 21/36* (2013.01); *G01C 21/3626* (2013.01); *G01C 21/3629* (2013.01)

(58) Field of Classification Search
USPC .......................................................... 701/454
See application file for complete search history.

(56) References Cited

U.S. PATENT DOCUMENTS

| | | | |
|---|---|---|---|
| 2004/0260465 A1* | 12/2004 | Tu | G01C 21/3679 701/426 |
| 2007/0208504 A1 | 9/2007 | Lee | |
| 2013/0124085 A1* | 5/2013 | Mochizuki | G01C 21/3415 701/466 |
| 2016/0069699 A1* | 3/2016 | Chen | G01C 21/3682 701/426 |
| 2016/0178383 A1* | 6/2016 | Mays | G01C 21/3673 701/408 |

* cited by examiner

NAVIGATION METHOD, APPARATUS, AND TERMINAL, AND STORAGE MEDIUM

RELATED APPLICATIONS

This application is a continuation application of PCT Patent Application No. PCT/CN2017/108288, filed on Oct. 30, 2017, which claims priority to Chinese Patent Application No. 201610993503.2, filed with the Chinese Patent Office on Nov. 10, 2016 and entitled "NAVIGATION METHOD AND APPARATUS", content of all of which is incorporated herein by reference in its entirety.

FIELD OF TECHNOLOGY

Embodiments of the present invention relate to the field of terminal technologies and, in particular, to a navigation method, apparatus, and terminal, and a storage medium.

BACKGROUND

In modern society, with urban development and road construction, roads in a city and roads between cities become extremely complex. To reduce a travel time, a user may install a navigation application in a terminal and, then, navigation is performed by using the navigation application.

In a related technology, when navigation is performed, the following method is mainly used. A terminal plans a navigation path according to a starting point and an end point that are set by a user in a navigation application, where the navigation path includes multiple sub road segments. The terminal determines whether a connection point between two adjacent sub road segments causes a divergence in the user's driving and, if the connection point between the two adjacent sub road segments causes a divergence, uses the connection point as a navigation guiding point, and uses a path between every two adjacent navigation guiding points as a first road segment, where each first road segment includes at least one sub road segment. For any first road segment, the terminal obtains a road name of a second road segment to which each sub road segment included in the first road segment leads, and uses the road name of the second road segment to which each sub road segment leads, as a directional road name of a navigation guiding point of the road segment. When it is detected that the terminal is located at a position of the navigation guiding point, the terminal prompts for each directional road name of the navigation guiding point in a form of voice announcement, text display, or the like.

However, in the related technology, a user is prompted with a directional road name of a navigation guiding point, but multiple directional road names can easily mislead the user, and even cause the user to deviate from a navigation path. Thus, such navigation method may be sometimes impractical.

The disclosed methods and systems are directed to solve one or more problems set forth above and other problems.

SUMMARY

Embodiments of the present invention provide a navigation method, apparatus, and terminal, and a storage medium, to avoid interference of irrelevant information to a user in a navigation process.

According to one aspect of the present disclosure, a navigation method is provided. The method is applied to a terminal, and the method includes, according to a pre-planned navigation path, determining navigation guiding points on the navigation path, where a path between every two adjacent navigation guiding points is a first road segment. The method also includes obtaining each directional road name of each navigation guiding point, the directional road name being a road name of a second road segment to which the navigation guiding point leads; and calculating a matching degree between each directional road name of the navigation guiding point and direction information of each third road segment, the third road segment being a first road segment on the navigation path, located after the navigation guiding point, and the direction information of the third road segment comprising a road name of the third road segment and a directional road name of the third road segment. Further, the method includes determining a weight value of each directional road name of the navigation guiding point according to the matching degree; and when it is detected that the terminal is at the navigation guiding point, prompting each directional road name of the navigation guiding point according to the weight value.

According to another aspect of the present disclosure, a navigation terminal is provided. The terminal includes a memory storing computer program instructions; and a processor coupled to the memory. When executing the computer program instructions, the processor is configured to perform: according to a pre-planned navigation path, determining navigation guiding points on the navigation path, a path between every two adjacent navigation guiding points being a first road segment; obtaining each directional road name of each navigation guiding point, the directional road name being a road name of a second road segment to which the navigation guiding point leads; calculating a matching degree between each directional road name of the navigation guiding point and direction information of each third road segment, the third road segment being a first road segment on the navigation path, located after the navigation guiding point, and the direction information of the third road segment comprising a road name of the third road segment and a directional road name of the third road segment; determining a weight value of each directional road name of the navigation guiding point according to the matching degree; and when it is detected that the terminal is at the navigation guiding point, prompting each directional road name of the navigation guiding point according to the weight value.

According to another aspect of the present disclosure, a non-transitory computer-readable storage medium is provided. The non-transitory computer-readable storage medium stores computer program instructions executable by at least one processor to perform: according to a pre-planned navigation path, determining navigation guiding points on the navigation path, a path between every two adjacent navigation guiding points being a first road segment; obtaining each directional road name of each navigation guiding point, the directional road name being a road name of a second road segment to which the navigation guiding point leads; calculating a matching degree between each directional road name of the navigation guiding point and direction information of each third road segment, the third road segment being a first road segment on the navigation path, located after the navigation guiding point, and the direction information of the third road segment comprising a road name of the third road segment and a directional road name of the third road segment; determining a weight value of each directional road name of the navigation guiding point according to the matching degree; and when it is detected that the terminal is at the navigation guiding point, prompting each directional road name of the navigation guiding point according to the weight value.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objective, technical solutions, and advantages of embodiments of the present disclosure clearer, the following further describes the embodiments of the present disclosure in detail with reference to the accompanying drawings.

In modern life, usually, information indication signs are disposed at both sides of a road. A road name of a current road segment and each directional road name of the current road segment are indicated on the information indication sign. The directional road name is a road name of each second road segment to which the current road segment leads, and may be used by a user to determine a driving direction. Similar to a function of information indication signs at both sides of the road, in a process of performing navigation by using a navigation application, a directional road name of a navigation guiding point is prompted, so that a user can be effectively guided to determine a driving direction, thereby reducing a navigation deviation rate in the navigation process. In current navigation applications, when navigation is performed, directional road names of a navigation guiding point are not filtered, but the directional road names of the navigation guiding point are simply abbreviated and edited, and are then prompted to a user in a form of voice prompt or interface display. However, multiple directional road names that are not filtered can often mislead the user, and even cause the user to deviate from a navigation path. Using a fork in the Fourth Ring Road in Beijing city as an example, there is a divergence in front of the fork and the fork leads to different directions, drive to the right to enter the Third Ring Road, and drive to the left to enter the Fifth Ring Road. When a user drives to the fork, contradictory directional road names confuse the user, and even cause misleading to deviate from a navigation path.

Figure 1:
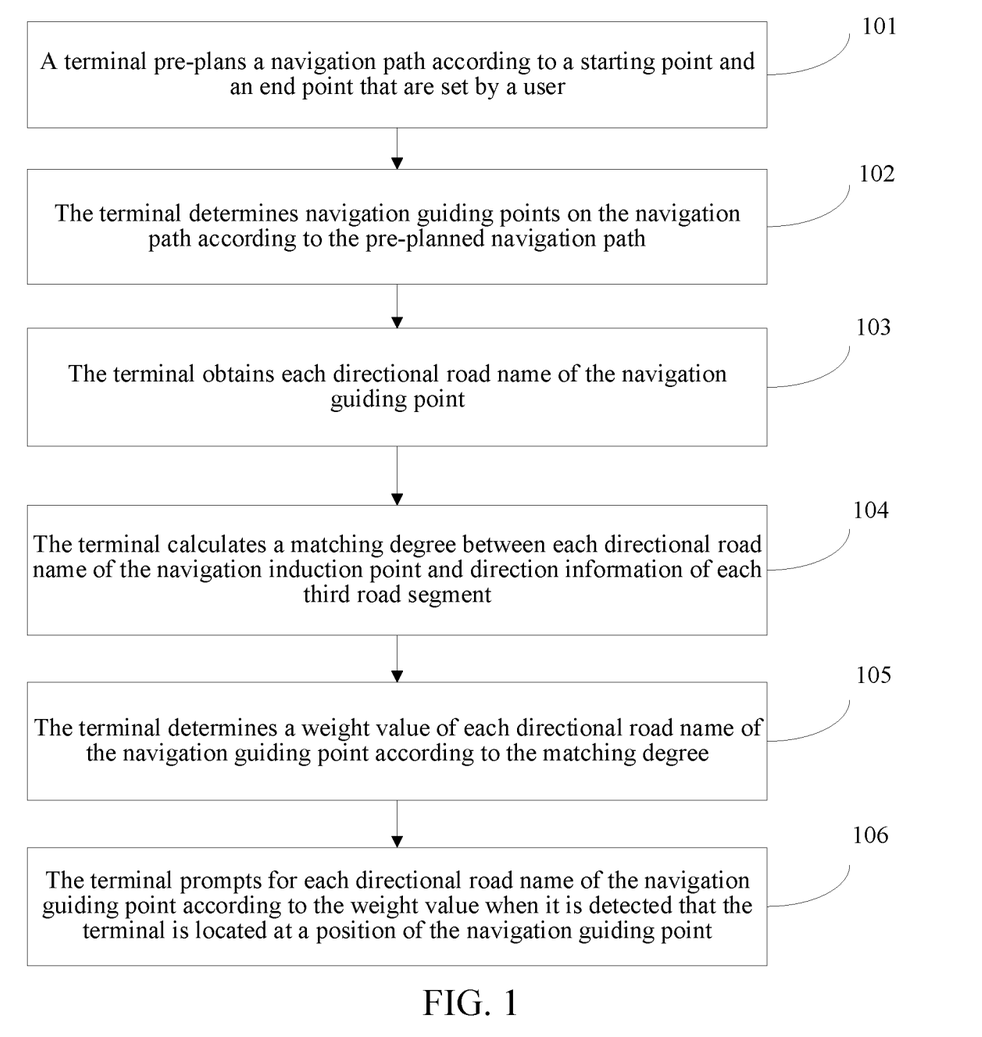
FIG. 1 is a flowchart of a navigation method according to an embodiment of the present disclosure.

To resolve such problem, an embodiment of the present disclosure provides a navigation method. The method is applied to a terminal, a navigation application is installed in the terminal, and the terminal can implement a navigation function by using the installed navigation application. During actual application, there are two types of terminals, one type is a device such as a smart phone, a tablet computer, or a personal computer, and the other type is an in-vehicle navigation device. To facilitate prompting a user, the terminal should further include a display screen that can display information such as a navigation path and a driving direction. Referring to FIG. 1, a procedure of the method provided in this embodiment of the present disclosure includes the followings.

101: The terminal pre-plans a navigation path according to a starting point and an end point that are set by a user.

In one embodiment of the present disclosure, the user may set the starting point and the end point in the navigation application according to a travel requirement; and the terminal pre-plans, for the user by using a path planning algorithm according to the starting point and the end point that are set by the user, a navigation path with the starting point pointing to the end point.

The path planning algorithm includes a Dijkstra algorithm, a Floyed algorithm, a Shortest Path Faster Algorithm (SPFA), an A* algorithm, a D* algorithm, a graph theory shortest algorithm, a genetic algorithm, a cellular automaton algorithm, an immune algorithm, a tabu search algorithm, a simulated annealing algorithm, an artificial neural network algorithm, an ant colony algorithm, a particle swarm optimization algorithm, and the like. The navigation path includes a vertex sequence, and each vertex includes a sub road segment (indicated as a link in one embodiment of the present disclosure) and a node (the node is a connection point between two adjacent sub road segments, and is indicated as a node in one embodiment of the present disclosure).

102: The terminal determines navigation guiding points on the navigation path according to the pre-planned navigation path.

When the user drives to certain nodes on the navigation path, these nodes easily cause the user to have a driving divergence, and the user needs to be guided so as to prevent the user from deviating from the navigation path. In one embodiment of the present disclosure, a node that easily causes the user to have a driving divergence, and causes interference to the user's driving is referred to as a navigation guiding point.

The process of determining, by the terminal, navigation guiding points according to the pre-planned navigation path is as follows: For any two adjacent sub road segments on the navigation path, the terminal determines whether a connection point between the two adjacent sub road segments causes the user to have a driving divergence; and if the connection point between the two adjacent sub road segments causes the user to have a driving divergence, determines that the connection point between the two adjacent road segments is a navigation guiding point; or if the connection point between the two adjacent sub road segments does not cause the user to have a driving divergence, or a driving direction can be determined through simple guidance, for example, by viewing the navigation path, may determine that the connection point is a navigation guiding point, and navigation induction does not need to be performed.

When the terminal determines whether the connection point between the two adjacent sub road segments causes the user to have a driving divergence, the following manner may be used: The terminal compares attribute information of the connection point between the two adjacent sub road segments with multiple preset guidance type policies, and if the connection point hits a guidance type policy, may determine that guidance needs to be performed for the connection point, and the connection point is a navigation guiding point; or if the connection point hits no guidance type policy, may determine that guidance does not need to be performed for the connection point, and the connection point is not a navigation guiding point. The attribute information of the connection point includes information such as an angle, an attribute, and a length.

Further, after the navigation guiding point is obtained, the terminal may reconstruct the navigation path by using the navigation guiding point, the starting point of the navigation path, and the end point of the navigation path as division points. The navigation path is reconstructed, so that at least two road segments (indicated as steps in one embodiment of the present disclosure) can be obtained, and each road segment includes at least one sub road segment. The at least two road segments include a path between every two adjacent navigation guiding points, a path between the navigation guiding point and the starting point, and a path between the navigation guiding point and the end point.

The process of reconstructing the navigation path according to the navigation guiding point is described below by using FIG. 2 as an example.

Figure 2:
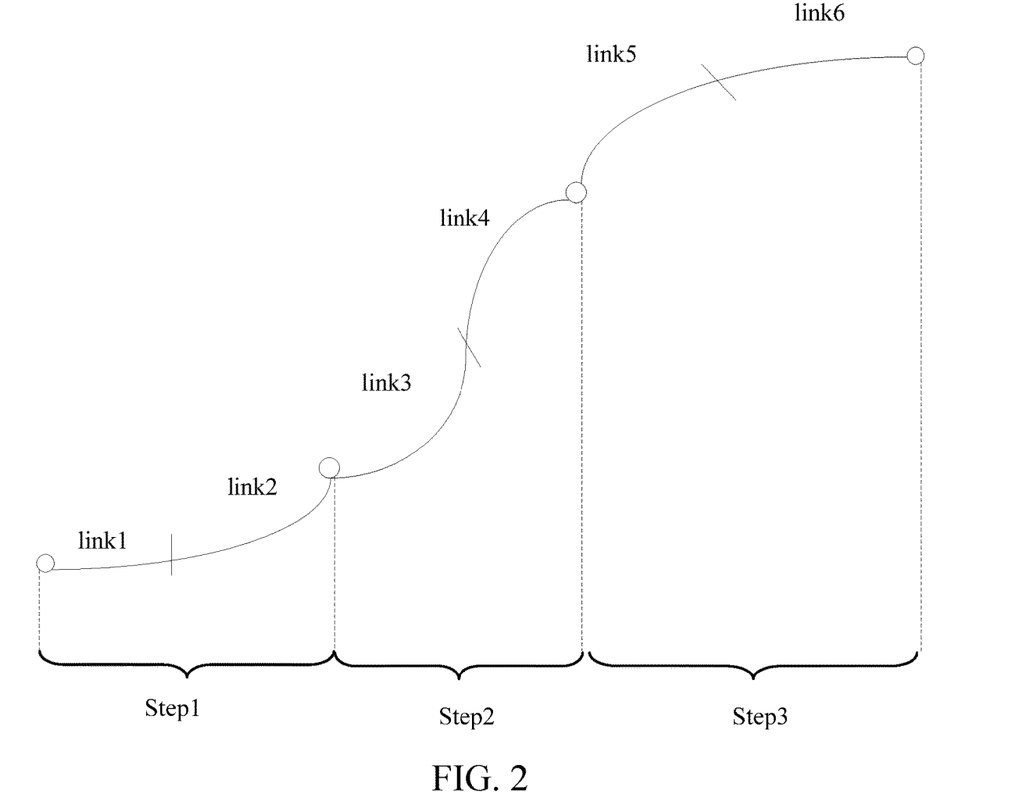
FIG. 2 is a schematic diagram of reconstruction of a navigation path according to another embodiment of the present disclosure.

Referring to FIG. 2, the terminal pre-plans a navigation path from the starting point to the end point according to the starting point and the end point that are set by the user. The navigation path includes six sub road segments that are respectively link1, link2, link3, link4, link5, and link6, where link1 and link2 are two adjacent sub road segments, link2 and link3 are two adjacent sub road segments, link3 and link4 are two adjacent sub road segments, link4 and link5 are two adjacent sub road segments, and link5 and link6 are two adjacent sub road segments. The terminal determines whether a connection point between link1 and link2, a connection point between link2 and link3, a connection point between link3 and link4, a connection point between link4 and link5, or a connection point between link5 and link6 causes the user to have a driving divergence, and may obtain through determining that the connection point between link2 and link3 and the connection point between link4 and link5 cause the user to have a driving divergence; and therefore, uses each of the connection point between link2 and link3 and the connection point between link4 and link5 as a navigation guiding point, and reconstructs the navigation path according to the starting point of the navigation path, the end point of the navigation path, and the two determined navigation guiding points, to obtain three road segments that are respectively step1, step2, and step3. The step1 includes link1 and link2, step2 includes link3 and link4, and step3 includes link5 and link6.

103: The terminal obtains each directional road name of the navigation guiding point.

The directional road name of the navigation guiding point is a road name of a second road segment to which the navigation guiding point leads. When obtaining each directional road names of the navigation guiding point, the terminal may use step 1031 and step 1032.

1031: The terminal obtains a road name of each second road segment to which a specified first road segment leads.

The specified first road segment is a first road segment using the navigation guiding point as an end connection point on the navigation path.

When obtaining the road name of each second road segment to which the specified first road segment leads, the terminal may use the following step 10311 and step 10312.

10311: The terminal obtains each sub road segment included in the specified first road segment, and obtains a road name of a second road segment to which each sub road segment leads.

In one embodiment of the present disclosure, a road network database is maintained. The road network database stores direction information of each sub road segment in an area of the navigation path and connection point information. The direction information of the sub road segment includes a road name of the sub road segment, a road name of a second road segment to which the sub road segment leads, and the like. The connection point information includes a road name of a second road segment to which a connection point leads, a movement direction of the user along the navigation path with the connection point as a reference point, a type of the connection point, and the like. The type of the connection point includes a crossroad d, a turning point, and the like. The road network database may be locally stored in the terminal or may be stored in a server corresponding to the navigation application.

Based on the road network database, the terminal may obtain the road name of the second road segment to which each sub road segment included in the specified first road segment leads.

10312: The terminal combines the road name of the second road segment to which each sub road segment leads, to obtain the road name of the second road segment to which the specified first road segment leads.

The terminal combines the road name of the second road segment to which each sub road segment included in the specified first road segment leads, and removes a duplicate road name of a second road segment, to obtain the road name of the second road segment to which the specified first road segment leads.

Using FIG. 2 as an example, step1 includes link1 and link2, road names of second road segments to which link1 leads are m and n, and road names of second road segments to which link2 leads are m, n, and s. The terminal combines the road names of the second road segments to which link1 leads and the road names of the second road segments to which link2 leads, to obtain road names of second road segments to which step1 leads that are m, n, and s.

In addition, when obtaining the road name of each second road segment to which the specified first road segment leads, the terminal may obtain, from the road network database, the road name of each sub road segment included in the specified first road segment, and combine the road name of each sub road segment, to obtain a road name of the specified first road segment. Using FIG. 2 as an example, step1 includes link1 and link2, a road name of link1 is a, and a road name of link2 is b. The terminal combines the road name of link1 and the road name of link2, to obtain road names of step1 that are a and b.

It should be noted that, a road name of a same road segment may be expressed in different representation manners with similar semantics. To avoid road names representing a same road segment from appearing repeatedly, when the road name of each sub road segment included in the specified first road segment is combined, fuzzy processing may be performed, for example, "the national road 301" and "G301" are used as a same road name. To facilitate management on at least two first road segments included in the navigation path, in one embodiment of the present disclosure, a same term may be used to describe the specified first road segment, for example, "G**" is used to represent a national road.

1032: The terminal uses the road name of each second road segment to which the specified first road segment leads, as each directional road name of the navigation guiding point.

After obtaining the road name of each second road segment to which the specified first road segment leads, the terminal may directly use the road name of each second road segment to which the specified first road segment leads, as each directional road name of the navigation guiding point.

104: The terminal calculates a matching degree between each directional road name of the navigation guiding point and direction information of each third road segment.

The third road segment is a first road segment, located behind the navigation guiding point, on the navigation path, and the direction information of the third road segment includes a road name of the third road segment and a directional road name of the third road segment.

A method for determining, by the terminal, the third road segment in the first road segment includes: traversing, by the terminal, first road segments located behind the navigation guiding point along the direction of the navigation path; determining, by the terminal in a process of traversing the first road segments, whether the first road segment satisfies an optional condition; and stopping the traversal if the first road segment does not satisfy the optional condition; or using, if the first road segment satisfies the optional condition, the first road segment that satisfies the optional condition as a third road segment.

The optional condition is that the end point of the navigation path is not traversed and an accumulated distance is less than a preset distance, or the like. The accumulated distance is a distance between a current position of the first road segment and the starting point of the navigation path. The preset distance may be determined according to the navigation path and a calculation capability of the terminal. The preset distance is any natural number greater than 0 and less than a length of the navigation path. That is, in the process of traversing the first road segments, if the end point of the navigation path is not traversed, and the accumulated distance is less than the preset distance, a traversed first road segment is used as a third road segment; if the end point of the navigation path is traversed, even if the accumulated distance is less than the preset distance, the traversal is stopped; or if the end point of the navigation path is not traversed, but the accumulated distance is greater than the preset distance, the traversal is stopped. Because the navigation process is performed in real time, the optional condition is set to ensure that, during traversal of the first road segments, the end point of the navigation path is not exceeded, and ensure that, during traversal of the first road segments, the preset distance is not exceeded, thereby improving navigation efficiency of the terminal while performing normal navigation.

It should be noted that, multiple road segments are used in one embodiment of the present disclosure. A first road segment is a road segment between two adjacent navigation guiding points, and the first road segment is on the navigation path, and a road segment that the user needs to pass through. A second road segment is a road segment to which a navigation guiding point can lead, and the second road segment may be on the navigation path or may not be on the navigation path. The second road segment is not a road that the user needs to pass through but is a road that the user selectively passes through. Therefore, the second road segment is also referred to as an optional road. A third road segment is a first road segment that is located, after a navigation guiding point, on the navigation path and satisfies the optional condition. The third road segment is on the navigation path. Because the third road segment is a road segment obtained by using the optional condition, the third road segment is also referred to as an optional road segment.

A road segment that the user actually passes through subsequently has relatively high reference value for a current road segment. Therefore, the matching degree between each directional road name of the navigation guiding point and the direction information of each third road segment needs to be calculated, to determine a weight value of each directional road name of the navigation guiding point according to the matching degree, and then prompt for each directional road name of the navigation guiding point according to the weight value.

A calculation process of calculating, by the terminal, the matching degree between each directional road name of the navigation guiding point and the direction information of each third road segment includes: calculating a road name matching degree between any directional road name of the navigation guiding point and a road name of any third road segment; calculating a directional road name matching degree between the directional road name of the navigation guiding point and the directional road name of the third road segment; and using a sum of the road name matching degree and the directional road name matching degree as a matching degree between the directional road name of the navigation guiding point and the direction information of any third road segment. The directional road name of the third road segment is a road name of a second road segment to which a navigation guiding point at an end connection point on the third road segment leads.

When calculating the matching degree $W_{add}$ between any directional road name of the navigation guiding point and the direction information of any third road segment, the terminal may use the following formula for calculation:

$$W_{add}=K_R \times W_{Roadlevel}+K_D \times \eta \times W_{Roadlevel} \tag{1}$$

$K_R \times W_{Roadlevel}$ indicates the matching degree of the road name of the third road segment; $K_R$ indicates a matching coefficient of the road name of the third road segment, and $K_R$ may be 1 or 0; when $K_R=1$, it indicates that any directional road name of the navigation guiding point matches a road name of any third road segment; when $K_R=0$, it indicates that any directional road name of the navigation guiding point does not match a road name of any third road segment; $K_D \times \eta \times W_{Roadlevel}$ indicates the directional road name matching degree of the third road segment; $K_D$ indicates a matching coefficient of the directional road name of the third road segment, and $K_D$ may be 1 or 0; when $K_D=1$, it indicates that any directional road name of the navigation guiding point matches any directional road name of any third road segment; when $K_D=0$, it indicates that any directional road name of the navigation guiding point does not match any directional road name of any third road segment; $\eta$ is an attenuation coefficient; and $W_{Roadlevel}$ is a preset weight coefficient, $W_{Roadlevel}$ is related to a road level, a higher road level indicates a higher $W_{Roadlevel}$, and for current domestic roads, road levels in descending order are successively, from high to low, a highway, an urban expressway, a national road, a provincial road, a county road, a village road, another road, a ninth-level road, a ferry, a pedestrian road, and the like.

It should be noted that, because a road name of each first road segment is obtained by combining the road name of each sub road segment included in the first road segment, when matching is performed between any directional road name of the navigation guiding point and a road name of any third road segment, provided that any directional road name of the navigation guiding point is the same as a road name of any sub road segment included in any third road segment, it is considered that any directional road name of the navigation guiding point matches the road name of any third road segment.

105: The terminal determines a weight value of each directional road name of the navigation guiding point according to the matching degree.

For any directional road name of the navigation guiding point, after obtaining a matching degree between the directional road name and the direction information of each third road segment, the terminal may use a sum of matching degrees between the directional road name and the direction information of the third road segments, as a weight value of the directional road name.

During specific implementation of the process, the following formula may be used:

$$W_{sum} = \sum_{1}^{n} W_{add} \quad (2)$$

$W_{sum}$ is a weight value of any directional road name of the navigation guiding point, and n is a number of third road segments on the navigation path.

Figure 3:
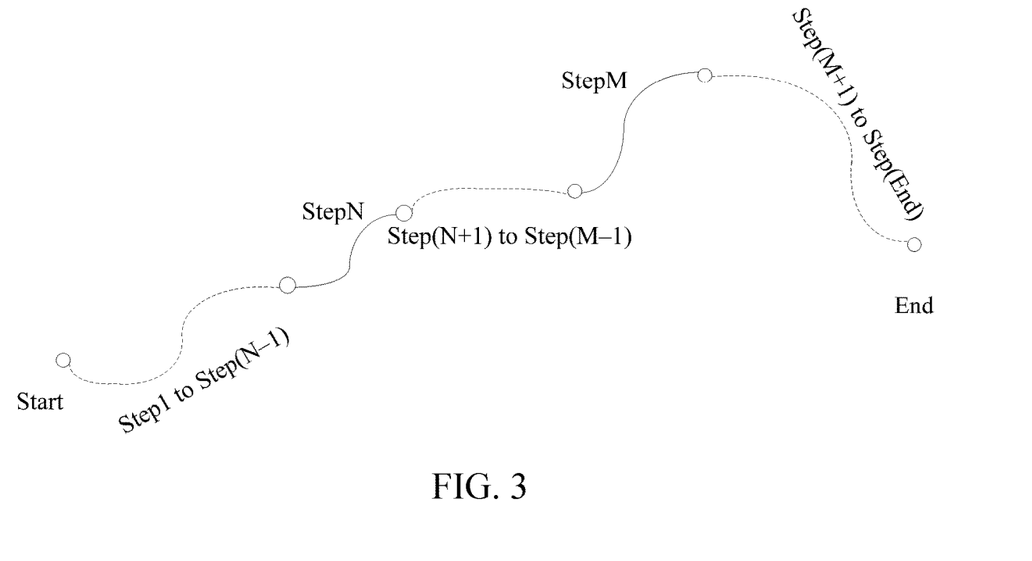
FIG. 3 is a schematic diagram of a navigation path according to another embodiment of the present disclosure.

For the process of determining the weight value of any directional road name of the navigation guiding point in step 104 and step 105, refer to FIG. 3.

Referring to FIG. 3, a specified first road segment using the navigation guiding point as an end connection point is set to stepN; for any directional road name a of the navigation guiding point, the terminal determines whether step(N+1) satisfies the optional condition, and if step(N+1) does not satisfy the optional condition, stops the traversal; or if step(N+1) satisfies the optional condition, the terminal performs matching between the directional road name a and a road name of step(N+1), performs matching between the directional road name a and each directional road name of step(N+1), and then calculates a matching degree between the directional road name a and direction information of step(N+1) by using the formula (1).

To intuitively display the weight value of each directional road name, in one embodiment, a form of <directional road name, weight value> is used to indicate the road name of the second road segment to which the navigation guiding point leads and the weight value. After determining the weight value of each directional road name of the navigation guiding point, the terminal may add the weight value of each directional road name of the navigation guiding point to a structural sequence of <directional road name, weight value>.

Determining of the weight value of any directional road name of the navigation guiding point is used as an example for description above. For a process of determining a weight value of another directional road name of the navigation guiding point, refer to step 104 and step 105, and details are not described again.

106: The terminal prompts for each directional road name of the navigation guiding point according to the weight value when it is detected that the terminal is located at a position of the navigation guiding point.

In the navigation process, the terminal prompts for each directional road name of the navigation guiding point according to the weight value when it is detected that the terminal is located at a position of the navigation guiding point.

In one embodiment of the present disclosure, if there is a directional road name whose weight value is 0, the terminal removes the directional road name whose weight value is 0, and sorts directional road names whose weight values are not 0 based on a descending order of the weight value, and sequentially prompts, based on the sorting result, for the directional road names whose weight values are not 0. For example, a directional road name having a largest weight value is prompted or, based on the sorting result, a directional road name having a largest weight value is prompted in priority.

In one embodiment of the present disclosure, if the weight value of each directional road name of the navigation guiding point is 0, the directional road names of the navigation guiding point are sequentially prompted.

In addition, to remind the user in time, when prompting for the directional road name of the navigation guiding point according to the weight value, the terminal may prompt in a preset prompting manner. The preset prompting manner includes one of text prompt, voice prompt, image display, and the like. That is, the terminal may display, based on the sorting result, each directional road name at a position of the navigation guiding point on the navigation path. The terminal may also prompt each directional road name in a voice prompt manner based on the sorting result. The terminal may also display an image at a position of the navigation guiding point, and display each directional road name on the image based on the sorting result. To draw attention from the user, the terminal may prompt the user by using both the text prompting manner and the voice prompt manner. The terminal may also prompt the user by using both the voice prompt manner and the image display manner. Certainly, when prompting for each directional road name of the navigation guiding point, the terminal may further prompt the user with a speed limit on each second road segment, whether there is a camera, and the like. In addition, in consideration of limited space of a display interface of the terminal and a limited prompt time, before each directional road name of the navigation guiding point is prompted, each directional road name of the navigation guiding point and other information may be edited or removed, to avoid hindering vision of the user, and the user can hear a complete directional road name of the navigation guiding point before moving to a next first road segment from the navigation guiding point.

Figure 4:
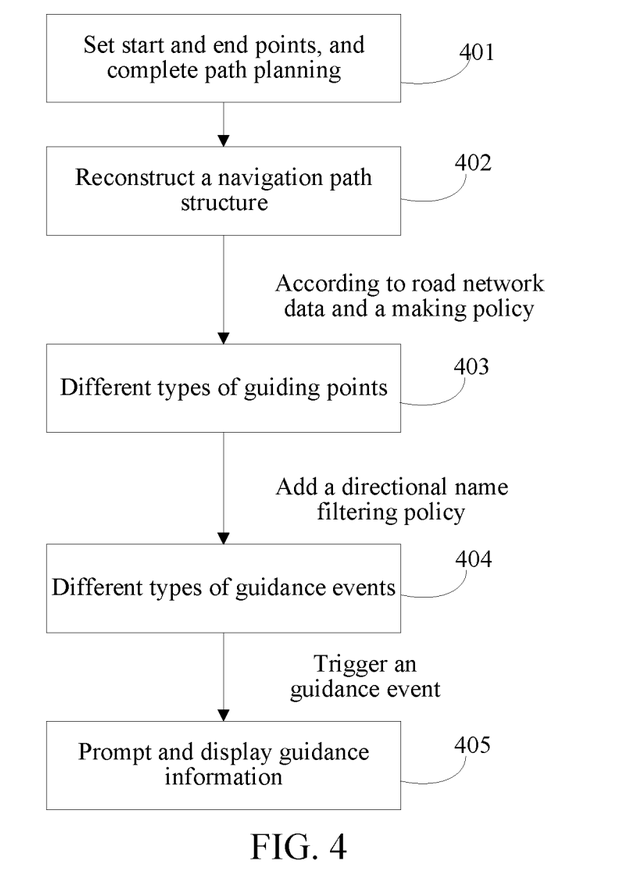
FIG. 4 is a schematic diagram of a navigation process according to another embodiment of the present disclosure.

For ease of description of the foregoing entire navigation process, FIG. 4 is used as an example for detailed description below.

Referring to FIG. 4, the terminal pre-plans a navigation path according to a starting point and an end point that are set by the user in the navigation application, determines, according to the pre-planned navigation path, navigation guiding points on the navigation path (401). Further, the terminal reconstructs the pre-planned navigation path according to the navigation guiding point, the starting point of the navigation path, and the end point of the navigation path (402). Based on the reconstructed path, the terminal obtains each directional road name of the navigation guiding point according to the road network database, uses a directional road name filtering policy, determines a weight value of each road name of the navigation guiding point, and filters each directional road name of the navigation guiding point (403). Further, the terminal detects different types of guidance events and triggers a corresponding action according to a specific guidance event (404). For example, the terminal cuts off a directional road name whose weight value is 0, so that when it is detected that a guidance event occurs, that is, the user is at the navigation guiding point, each directional road name of the navigation guiding point is prompted based on a sorting result (405).

According to the method provided in one embodiment of the present disclosure, a matching degree between each directional road name of a navigation guiding point and direction information of each third road segment is calculated; a weight value of each directional road name is determined; and further, a directional road name of the navigation guiding point is prompted according to a weight value. Because a possibility of passing through a second road segment having a higher weight value is higher during an actual navigation process, and interference of irrelevant information to a user is avoided, improving the navigation efficiency.

Figure 5:
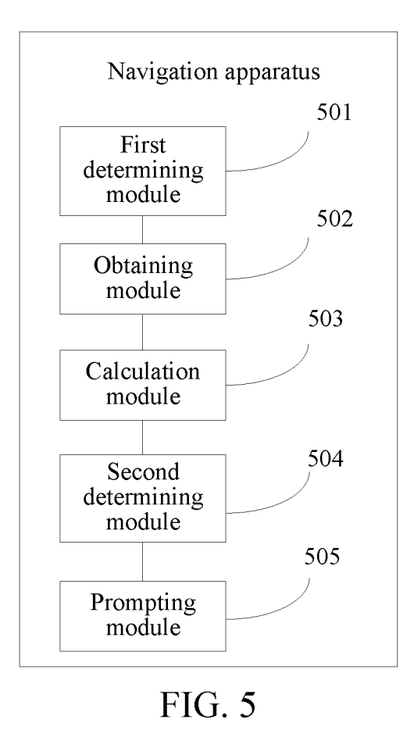
FIG. 5 is a schematic structural diagram of a navigation apparatus according to another embodiment of the present disclosure.

Referring to FIG. 5, an embodiment of the present disclosure provides a navigation apparatus. The apparatus is disposed in a terminal, and the apparatus includes a first determining module 501, an obtaining module 502, a calculation module 503, a second determining module 504, and a prompting module 505.

The first determining module 501 is configured to determine, according to a pre-planned navigation path, navigation guiding points on the navigation path, where a path between every two adjacent navigation guiding points is a first road segment.

The obtaining module 502 is configured to obtain each directional road name of the navigation guiding point, the directional road name being a road name of a second road segment to which the navigation guiding point leads.

The calculation module 503 is configured to calculate a matching degree between each directional road name of the navigation guiding point and direction information of each third road segment, the third road segment being a first road segment, located behind the navigation guiding point, on the navigation path, and the direction information of the third road segment including a road name of the third road segment and a directional road name of the third road segment.

The second determining module 504 is configured to determine a weight value of each directional road name of the navigation guiding point according to the matching degree; and the prompting module 505 is configured to prompt for each directional road name of the navigation guiding point according to the weight value when it is detected that the terminal is located at a position of the navigation guiding point.

In one embodiment of the present disclosure, the calculation module 503 is configured to: calculate a road name matching degree between any directional road name of the navigation guiding point and a road name of any third road segment; calculate a directional road name matching degree between the directional road name of the navigation guiding point and each directional road name of any third road segment; and use a sum of the road name matching degree and the directional road name matching degree as a matching degree between the directional road name of the navigation guiding point and the direction information of any third road segment.

In one embodiment of the present disclosure, the calculation module 503 is configured to use a sum of matching degrees between any directional road name of the navigation guiding point and the direction information of the third road segments as a weight value of the directional road name of the navigation guiding point.

Figure 6:
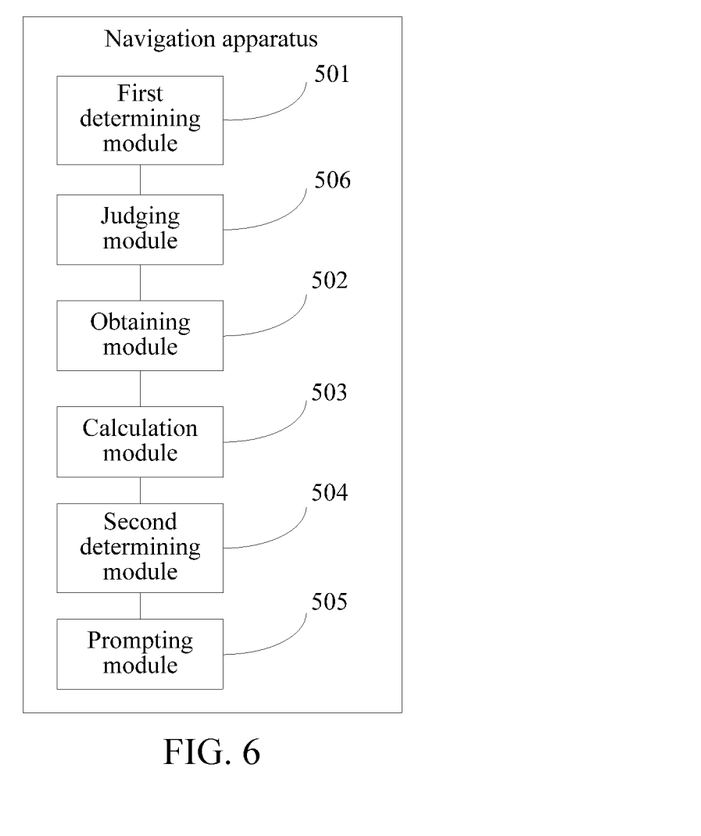
FIG. 6 is a schematic structural diagram of a navigation apparatus according to another embodiment of the present disclosure.

Referring to FIG. 6, in one embodiment of the present disclosure, the apparatus further includes a judging module 506. The judging module 506 is configured to: traverse first road segments located behind the navigation guiding point along a direction of the navigation path; determine, in a process of traversing the first road segments, whether the first road segment satisfies an optional condition; and use, if the first road segment satisfies the optional condition, the first road segment that satisfies the optional condition as a third road segment; or stop the traversal if the first road segment does not satisfy the optional condition.

In one embodiment of the present disclosure, the judging module 506 is configured to: determine, in the process of traversing the first road segments, whether an end point of the navigation path is traversed and whether an accumulated distance exceeds a preset distance, where the accumulated distance is a distance between the first road segment and a starting point of the navigation path; and determine, if the end point of the navigation path is not traversed and the accumulated distance does not exceed the preset distance, that the first road segment satisfies the optional condition.

In one embodiment of the present disclosure, the prompting module 505 is configured to: cut off, if there is a road name of an optional road whose weight value is 0, the directional road name whose weight value is 0; and sort directional road names whose weight values are not 0 based on a descending order of the weight value, and sequentially prompt, based on a sorting result, for the directional road names whose weight values are not 0.

In one embodiment of the present disclosure, the navigation path includes at least two first road segments, each first road segment includes at least one sub road segment, and the first determining module 501 is configured to: for any two adjacent sub road segments on the navigation path, determine whether a connection point between the two adjacent sub road segments causes a divergence during driving of a user; and determine, if the connection point between the two adjacent sub road segments causes the user to have a driving divergence, that the connection point between the two adjacent sub road segments is a navigation guiding point.

In one embodiment of the present disclosure, the obtaining module 502 is configured to: obtain a road name of each second road segment to which a specified first road segment leads, where the specified first road segment is a first road segment using the navigation guiding point as an end connection point; and use the road name of each second road segment to which the specified first road segment leads, as each directional road name of the navigation guiding point.

In another embodiment of the embodiments of the present disclosure, the obtaining module 502 is configured to: obtain each sub road segment included in the specified first road segment, and obtain a road name of a second road segment to which each sub road segment leads; and combine the road name of the second road segment to which each sub road segment leads, to obtain the road name of the second road segment to which the specified first road segment leads.

In conclusion, the apparatus provided in one embodiment of the present disclosure calculates a matching degree between each directional road name of a navigation guiding point and direction information of each third road segment; determines a weight value of each directional road name; and further, prompts for each directional road name of the navigation guiding point according to a weight value. Because a possibility of passing through a second road segment having a higher weight value is higher during an actual navigation process, interference of irrelevant information to a user is avoided, and the navigation method is more proper.

Figure 7:
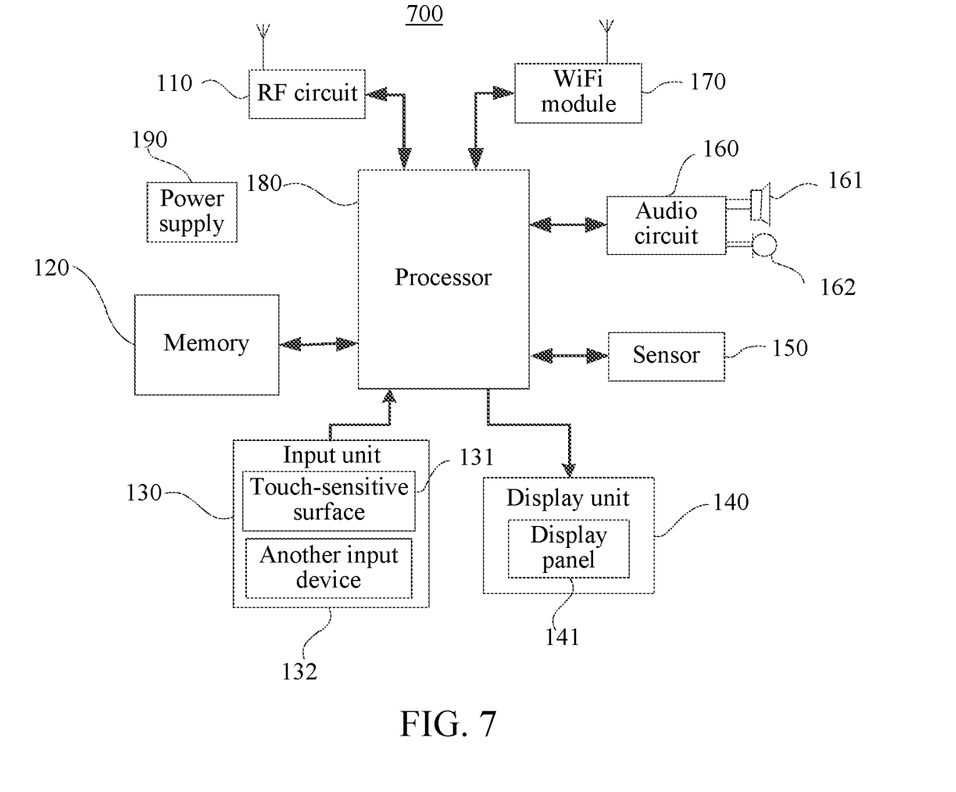
FIG. 7 is a schematic structural diagram of a navigation terminal according to an embodiment of the present disclosure.

FIG. 7 is a schematic structural diagram of a navigation terminal according to an embodiment of the present disclosure. The terminal may be configured to implement the navigation method provided in the foregoing embodiment.

Referring to FIG. 7, the terminal 700 may include components such as a radio frequency (RF) 110, a memory 120 including one or more computer-readable storage mediums, an input unit 130, a display unit 140, a sensor 150, an audio circuit 160, a wireless fidelity (WiFi) module 170, a processor 180 including one or more processing cores, and a power supply 190. A person skilled in the art may understand that the structure of the terminal shown in FIG. 7 does not constitute a limitation to the terminal, and the terminal may include more components or fewer components than those shown in the figure, or some components may be combined, or a different component deployment may be used.

The RF circuit 110 may be configured to receive and send signals during information receiving and sending or during a call. Particularly, the RF circuit 110 receives downlink information from a base station, then delivers the downlink information to one or more processors 180 for processing, and sends related uplink data to the base station. Generally, the RF circuit 110 includes an antenna, at least one amplifier, a tuner, one or more oscillators, a subscriber identity module (SIM) card, a transceiver, a coupler, a low noise amplifier (LNA), and a duplexer. In addition, the RF circuit 110 may further communicate with a network and another device through wireless communication. The wireless communication may use any communication standard or protocol, including but not limited to a Global System for Mobile communications (GSM), a general packet radio service (GPRS), Code Division Multiple Access (CDMA), Wideband Code Division Multiple Access (WCDMA), Long Term Evolution (LTE), an email, a Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 700, and the like. In addition, the memory 120 may include a high-speed random-access memory (RAM), and may further include a non-volatile memory, such as at least one magnetic disk storage device, a flash memory, or other volatile solid-state storage devices. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical or track ball signal input related to the user setting and function control. Specifically, the input unit 130 may include a touch-sensitive surface 131 and another input device 132. The touch-sensitive surface 131, which is also referred to as a touchscreen or a touch panel, may collect a touch operation of a user on or near the touch-sensitive surface (such as an operation of a user on or near the touch-sensitive surface 131 by using any suitable object or accessory such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 180. Moreover, the touch controller can receive and execute a command sent by the processor 180. In addition, the touch-sensitive surface 131 may be implemented in multiple types, such as a resistive type, a capacitive type, an infrared type, and a surface acoustic wave type. In addition to the touch-sensitive surface 131, the input unit 130 may further include the another input device 132. Specifically, the another input device 132 may include, but is not limited to, one or more of a physical keyboard, a function key (for example, a volume control key or a power on/off key), a trackball, a mouse, or a joystick.

The display unit 140 may be configured to display information entered by the user or information provided for the user, and various graphical user interfaces of the terminal 700. The graphical user interfaces may be composed of graphics, texts, icons, videos, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 141 transfers the touch operation to the processor 180, to determine the type of the touch event. Then, the processor 180 provides a corresponding visual output on the display panel 141 according to the type of the touch event. Although, in FIG. 7, the touch-sensitive surface 131 and the display panel 141 are used as two separate parts to implement input and output functions, in some embodiments, the touch-sensitive surface 131 and the display panel 141 may be integrated to implement the input and output functions.

The terminal 700 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 700 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal 700, are not described in detail herein.

The audio circuit 160, a speaker 161, and a microphone 162 may provide audio interfaces between the user and the terminal 700. The audio circuit 160 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 160 receives the electrical signal and converts the electrical signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 700.

The WiFi is based on a short distance wireless transmission technology. The terminal 700 may help, by using the WiFi module 170, the user to receive and send e-mails, browse a web page, access streaming media, and so on, which provides wireless broadband Internet access for the user. Although FIG. 7 shows the WiFi circuit 170, it may be understood that the WiFi circuit 170 is not a necessary component of the terminal 700, and when required, the WiFi circuit 170 may be omitted as required as long as the scope of the essence of the present disclosure is not changed.

The processor 180 is a control center of the terminal 700, which is connected to various parts of the entire mobile phone by using various interfaces and lines. By running or executing a software program and/or module stored in the memory 120 and invoking data stored in the memory 120, the processor 180 performs various functions of the terminal 700 and processes data, so as to perform overall monitoring on the mobile phone. Optionally, the processor 180 may include one or more processing cores. Optionally, the processor 180 may integrate an application processor and a modem processor. The application processor mainly processes an operating system, a user interface, an application program, and the like. The modem processor mainly processes wireless communication. It may be understood that the foregoing modem processor may not be integrated into the processor 180.

The terminal 700 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 700 may further include a camera, a Bluetooth module, and the like. Details are not described herein. Specifically, in one embodiment of the present disclosure, the display unit of the terminal 700 is a touchscreen display. The terminal 700 may further include a memory. The memory is configured to store at least one instruction, at least one program, and a code set or an instruction set, and the at least one instruction, the at least one program, the code set or the instruction set is loaded by the processor 180 to perform the navigation method shown in FIG. 1.

The terminal provided in one embodiment of the present disclosure calculates a matching degree between each directional road name of a navigation guiding point and direction information of each third road segment; determines a weight value of each directional road name; and further, prompts for each directional road name of the navigation guiding point according to a weight value. Because a possibility of passing through a second road segment having a higher weight value is higher during an actual navigation process, and interference of irrelevant information to a user is avoided, improving the navigation efficiency.

An embodiment of the present disclosure further provides a storage medium. The storage medium may be a computer-readable storage medium included in the memory in the foregoing embodiment, or may be a storage medium that exists separately and is not equipped into a terminal. The storage medium stores at least one instruction, at least one program, and a code set or an instruction set, and the at least one instruction, the at least one program, the code set or the instruction set is loaded by a processor to perform the navigation method shown in FIG. 1.

According to the storage medium provided in one embodiment of the present disclosure, a matching degree between each directional road name of a navigation guiding point and direction information of each third road segment is calculated; a weight value of each directional road name is determined; and further, each directional road name of the navigation guiding point is prompted according to a weight value. Because a possibility of passing through a second road segment having a higher weight value is higher during an actual navigation process, and interference of irrelevant information to a user is avoided, improving the navigation efficiency.

An embodiment of the present disclosure provides a graphical user interface. The graphical user interface is used on a navigation terminal. The navigation terminal includes a touchscreen display, a memory, and one or more processors configured to execute one or more programs. The graphical user interface is configured to perform the navigation method shown in FIG. 1.

According to the graphical user interface provided in one embodiment of the present disclosure, a matching degree between each directional road name of a navigation guiding point and direction information of each third road segment is calculated; a weight value of each directional road name is determined; and further, each directional road name of the navigation guiding point is prompted according to a weight value. Because a possibility of passing through a second road segment having a higher weight value is higher during an actual navigation process, and interference of irrelevant information to a user is avoided, improving the navigation efficiency.

It should be noted that, when the navigation apparatus and the navigation terminal that are provided in the foregoing embodiments perform navigation, only divisions of the foregoing functional modules are described by using an example. During actual application, the foregoing functions may be allocated to and completed by different functional modules according to requirements, that is, the internal structures of the navigation apparatus and the navigation terminal are divided into different functional modules, to complete all or some of the foregoing described functions. In addition, the navigation apparatus and the navigation terminal that are provided in the foregoing embodiments belong to the same concept as the embodiment of the navigation method, and for a specific implementation process thereof, refer to the method embodiment, and details are not described herein again.

A person of ordinary skill in the art may understand that all or some of the steps of the embodiments may be implemented by hardware or a program instructing related hardware. The program may be stored in a computer-readable storage medium. The storage medium may include: a ROM, a magnetic disk, or an optical disc.

The above descriptions are merely some embodiments of the present disclosure, and are not intended to limit the embodiments of the present disclosure. Any modification, equivalent replacement, and improvement made without departing from the spirit and principle of the embodiments of the present disclosure shall fall within the protection scope of the embodiments of the present disclosure.

What is claimed is:

1. A navigation method for a terminal, comprising:
    according to a navigation path, determining, by the terminal, a first and a second navigation guiding points on the navigation path, a path between the first and the second navigation guiding points being a first road segment;
    obtaining, by the terminal, a directional road name of the second navigation guiding point, wherein the directional road name of the second navigation guiding point is obtained by:
        identifying two or more sub road segments included in the first road segment;
        identifying two or more second road segments respectively led from the two or more sub road segments included in the first read segment;
        obtaining two or more road names of the two or more second road segments; and
        combining the two or more road names of the second road segments to obtain the directional road name of the second navigation guiding point;
    calculating, by the terminal, a matching degree between the directional road name of the second navigation guiding point and direction information of a third road segment, the third road segment being a road segment on the navigation path located after the second navigation guiding point, and the direction information of the third road segment including a road name of the third road segment;
    determining, by the terminal, a weight value of the directional road name of the second navigation guiding point according to the matching degree; and
    in response to detecting that the terminal is at the second navigation guiding point, prompting, by the terminal, the directional road name of the second navigation guiding point according to the weight value.

2. The method according to claim 1, wherein the calculating the matching degree between the directional road name of the navigation guiding point and the direction information of the third road segment comprises:
    calculating a road name matching degree between the directional road name of the second navigation guiding point and the road name of the third road segment;
    calculating a directional road name matching degree between the directional road name of the second navigation guiding point and the directional road name of the third road segment; and
    using a sum of the road name matching degree and the directional road name matching degree as the matching degree between the directional road name of the second navigation guiding point and the direction information of the third road segment.

3. The method according to claim 1, wherein the determining the weight value of the directional road name of the second navigation guiding point according to the matching degree comprises:
    using a sum of matching degrees between any part of the directional road name of the second navigation guiding point and the direction information of the third road segments as the weight value of the directional road name of the second navigation guiding point.

4. The method according to claim 1, further comprising:
    traversing, by the terminal, first road segments located after the second navigation guiding point along a direction of the navigation path;
    determining, by the terminal in a process of traversing the first road segments, whether any of the first road segments satisfies an optional condition; and
    in response to determining one of the first road segments satisfies the optional condition, using, by the terminal, the one of the first road segments that satisfies the optional condition as the third road segment; and
    in response to determining none of the first road segments satisfies the optional condition, stopping, by the terminal, the traversal.

5. The method according to claim 4, wherein the determining, in the process of traversing the first road segments, whether the one of the first road segments satisfies the optional condition comprises:
    determining, in the process of traversing the first road segments, whether an end point of the navigation path is traversed and whether an accumulated distance exceeds a preset distance, wherein the accumulated distance is a distance between the first road segment and a starting point of the navigation path; and
    determining, in response to determining the end point of the navigation path is not traversed and the accumulated distance does not exceed the preset distance, that the one of the first road segments satisfies the optional condition.

6. The method according to claim 1, wherein the prompting for the directional road name of the second navigation guiding point according to the weight value comprises:
    cutting off, in response to determining there is a directional road name whose weight value is 0, the directional road name whose weight value is 0;
    sorting directional road names whose weight values are not 0 based on a descending order of the weight value; and
    sequentially prompting, based on a sorting result, for the directional road names whose weight values are not 0.

7. The method according to claim 1, wherein the navigation path includes two adjacent first road segments, and the determining navigation guiding points on the navigation path comprises:
    determining whether a connection point between the two adjacent sub road segments causes a user of the terminal to have a driving divergence; and
    determining, in response to determining the connection point between the two adjacent sub road segments causes the user to have a driving divergence, that the connection point between the two adjacent sub road segments is a navigation guiding point.

8. A navigation terminal, comprising: a memory storing computer program instructions; and a processor coupled to the memory and, when executing the computer program instructions, configured to perform:

according to a navigation path, determining a first and a second navigation guiding points on the navigation path, a path between the first and the second navigation guiding points being a first road segment;

obtaining a directional road name of the second navigation guiding point, wherein the directional road name of the second navigation guiding point is obtained by:
identifying two or more sub road segments included in the first road segment;
identifying two or more second road segments respectively led from the two or more sub road segments included in the first read segment;
obtaining two or more road names of the two or more second road segments; and
combining the two or more road names of the second road segments to obtain the directional road name of the second navigation guiding point;

calculating a matching degree between the directional road name of the second navigation guiding point and direction information of a third road segment, the third road segment being a road segment on the navigation path located after the second navigation guiding point, and the direction information of the third road segment including a road name of the third road segment;

determining a weight value of the directional road name of the second navigation guiding point according to the matching degree; and in response to detecting that the terminal is at the second navigation guiding point, prompting the directional road name of the second navigation guiding point according to the weight value.

9. The navigation terminal according to claim 8, wherein the calculating the matching degree between the directional road name of the navigation guiding point and the direction information of the third road segment comprises:

calculating a road name matching degree between the directional road name of the second navigation guiding point and the road name of the third road segment;

calculating a directional road name matching degree between the directional road name of the second navigation guiding point and the directional road name of the third road segment; and using a sum of the road name matching degree and the directional road name matching degree as the matching degree between the directional road name of the second navigation guiding point and the direction information of the third road segment.

10. The navigation terminal according to claim 8, wherein the determining the weight value of the directional road name of the second navigation guiding point according to the matching degree comprises:

using a sum of matching degrees between any part of the directional road name of the second navigation guiding point and the direction information of the third road segments as the weight value of the directional road name of the second navigation guiding point.

11. The navigation terminal according to claim 8, wherein the processor is further configured to perform:

traversing first road segments located after the second navigation guiding point along a direction of the navigation path;

determining, in a process of traversing the first road segments, whether any of the first road segments satisfies an optional condition; and in response to determining one of the first road segments satisfies the optional condition, using the one of the first road segments that satisfies the optional condition as the third road segment; and in response to determining none of the first road segments satisfies the optional condition, stopping the traversal.

12. The navigation terminal according to claim 11, wherein the determining, in the process of traversing the first road segments, whether the one of the first road segments satisfies the optional condition comprises:

determining, in the process of traversing the first road segments, whether an end point of the navigation path is traversed and whether an accumulated distance exceeds a preset distance, wherein the accumulated distance is a distance between the first road segment and a starting point of the navigation path; and determining, in response to determining the end point of the navigation path is not traversed and the accumulated distance does not exceed the preset distance, that the one of the first road segments satisfies the optional condition.

13. The navigation terminal according to claim 8, wherein the prompting for the directional road name of the second navigation guiding point according to the weight value comprises:

cutting off, in response to determining there is a directional road name whose weight value is 0, the directional road name whose weight value is 0;

sorting directional road names whose weight values are not 0 based on a descending order of the weight value; and sequentially prompting, based on a sorting result, for the directional road names whose weight values are not 0.

14. The navigation terminal according to claim 8, wherein the navigation path includes two adjacent first road segments, and the determining navigation guiding points on the navigation path comprises:

determining whether a connection point between the two adjacent sub road segments causes a user of the navigation terminal to have a driving divergence; and determining, in response to determining the connection point between the two adjacent sub road segments causes the user to have a driving divergence, that the connection point between the two adjacent sub road segments is a navigation guiding point.

15. A non-transitory computer-readable storage medium storing computer program instructions executable by at least one processor to perform:

according to a navigation path, determining a first and a second navigation guiding points on the navigation path, a path between the first and the second navigation guiding points being a first road segment;

obtaining a directional road name of the second navigation guiding point, wherein the directional road name of the second navigation guiding point is obtained by:
identifying two or more sub road segments included in the first road segment;
identifying two or more second road segments respectively led from the two or more sub road segments included in the first read segment;
obtaining two or more road names of the two or more second road segments; and
combining the two or more road names of the second road segments to obtain the directional road name of the second navigation guiding point;

calculating a matching degree between the directional road name of the second navigation guiding point and direction information of a third road segment, the third road segment being a road segment on the navigation path located after the second navigation guiding point, and the direction information of the third road segment including a road name of the third road segment;

determining a weight value of the directional road name of the second navigation guiding point according to the matching degree; and in response to detecting that the terminal is at the second navigation guiding point, prompting the directional road name of the second navigation guiding point according to the weight value.

16. The non-transitory computer-readable storage medium according to claim 15, wherein the calculating the matching degree between the directional road name of the navigation guiding point and the direction information of the third road segment comprises:

calculating a road name matching degree between the directional road name of the second navigation guiding point and the road name of the third road segment;

calculating a directional road name matching degree between the directional road name of the second navigation guiding point and the directional road name of the third road segment; and using a sum of the road name matching degree and the directional road name matching degree as the matching degree between the directional road name of the second navigation guiding point and the direction information of the third road segment.

17. The method according to claim 1, wherein combining the two or more road names of the second road segments to obtain the directional road name of the second navigation guiding point further comprises:

removing a duplicate road name from the two or more road names as combined.

18. The method according to claim 1, wherein the two or more sub road segments included in the first road segment include a first sub road segment and a second sub road segment, and the road names of one or more second road segments led from the first sub road segment include a first name and a second name, and road names of another or more second road segments led from the second sub road segment include the first name, the second name, and a third name, and wherein obtaining the directional road name of the second navigation guiding point further comprises:

combining the first name, the second name, and the third name together as the directional road name of the second navigation guiding point.

\* \* \* \* \*